(12) United States Patent  (10) Patent No.: US 12,427,481 B2
Yoshimura et al.  (45) Date of Patent: Sep. 30, 2025

(54) SEPARATION MEMBRANE

(71) Applicant: NITTO DENKO CORPORATION, Ibaraki (JP)

(72) Inventors: Kazuya Yoshimura, Ibaraki (JP); Hisae Shimizu, Ibaraki (JP); Makoto Katagiri, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 448 days.

(21) Appl. No.: 18/026,556

(22) PCT Filed: Aug. 2, 2021

(86) PCT No.: PCT/JP2021/028682
§ 371 (c)(1),
(2) Date: Mar. 15, 2023

(87) PCT Pub. No.: WO2022/059369
PCT Pub. Date: Mar. 24, 2022

(65) Prior Publication Data
US 2023/0338906 A1 Oct. 26, 2023

(30) Foreign Application Priority Data
Sep. 17, 2020 (JP) .................... 2020-156650

(51) Int. Cl.
*B01D 61/36* (2006.01)
*B01D 71/64* (2006.01)

(52) U.S. Cl.
CPC ......... *B01D 61/363* (2022.08); *B01D 61/365* (2022.08); *B01D 71/64* (2013.01); *B01D 2323/12* (2013.01); *B01D 2323/2182* (2022.08)

(58) Field of Classification Search
CPC .... B01D 61/363; B01D 61/365; B01D 71/64; B01D 2323/12; B01D 2323/218;
(Continued)

(56) References Cited

U.S. PATENT DOCUMENTS

2016/0310911 A1* 10/2016 Nagai ............... B01D 67/0006
2021/0394129 A1  12/2021 Ito et al.

FOREIGN PATENT DOCUMENTS

JP  H2-35923 A    2/1990
JP  H3-284335 A  12/1991
(Continued)

OTHER PUBLICATIONS

International Search Report issued for corresponding International Patent Application No. PCT/JP2021/028682 on Sep. 21, 2021, along with an English translation (5 pages).
(Continued)

*Primary Examiner* — Thuan D Dang
(74) *Attorney, Agent, or Firm* — Hauptman Ham, LLP

(57) ABSTRACT

The present invention provides a separation membrane suitable for separating water from a liquid mixture containing an alcohol and water, the separation membrane being capable of reducing a decrease in separation performance regardless of long-term use.
A separation membrane 10 of the present invention includes a polyimide having a structural unit X represented by the following formula (1) and a structural unit Y represented by following formula (2).

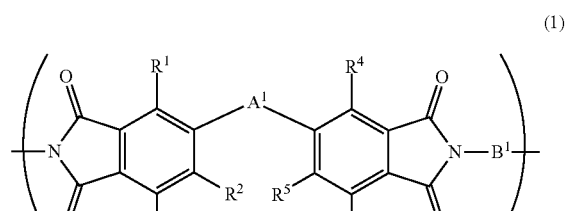

(1)

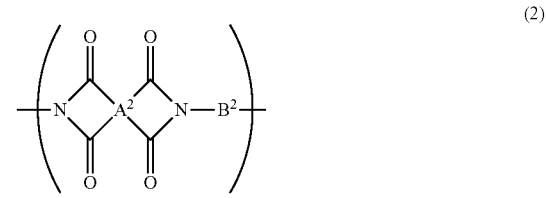

(2)

$A^1$ is a linking group including no arylene group in a main chain and having a solubility parameter, in accordance with a Fedors method, of more than 5.0 $(cal/cm^3)^{1/2}$. $A^2$ is a tetravalent organic group including an arylene group.

11 Claims, 2 Drawing Sheets

(58) Field of Classification Search
CPC ............... B01D 63/10; C08G 73/1042; C08G 73/1053; C08G 73/1071; C08G 73/16; C08L 79/08
See application file for complete search history.

(56) References Cited

FOREIGN PATENT DOCUMENTS

| | | |
|---|---|---|
| JP | H4-110030 A | 4/1992 |
| JP | 2003-38942 A | 2/2003 |
| WO | 2020/084996 A1 | 4/2020 |

OTHER PUBLICATIONS

Written Opinion issued for corresponding International Patent Application No. PCT/JP2021/028682 on Sep. 21, 2021 (3 pages).

* cited by examiner

SEPARATION MEMBRANE

CROSS REFERENCE TO RELATED APPLICATION

This application is a National Stage of International Application No. PCT/JP2021/028682, filed on Aug. 2, 2021, which designates the United States and was published in Japan, and which is based upon and claims priority to Japanese Patent Application No. 2020-156650, filed on Sep. 17, 2020 in the Japan Patent Office. All of the aforementioned applications are hereby incorporated by reference in their entireties.

TECHNICAL FIELD

The present invention relates to a separation membrane suitable for separating water from a liquid mixture containing an alcohol and water.

BACKGROUND ART

A pervaporation method and a vapor permeation method have been developed as methods for separating water from a liquid mixture containing an alcohol and water. These methods are particularly suitable for separating water from an azeotropic mixture such as a liquid mixture containing ethanol and water. The pervaporation method is also characterized in that it does not require a liquid mixture to be evaporated before being treated.

Examples of a material of a separation membrane used in the pervaporation method include zeolite, polyvinyl alcohol (PVA), and a polyimide. Zeolite and PVA are highly hydrophilic. Thus, when the content of water in a liquid mixture is high, a separation membrane made of zeolite or PVA swells with water, decreasing the separation performance of the separation membrane in some cases.

In contrast, a polyimide is a material that can better suppress the swelling with water than zeolite and PVA. For example, Patent Literature 1 discloses that a separation membrane including a polyimide can be used for the pervaporation method.

CITATION LIST

Patent Literature

Patent Literature 1: JP 2003-38942 A

SUMMARY OF INVENTION

Technical Problem

It is difficult to improve water separation performance of a separation membrane including a polyimide, the water separation performance being exhibited on a liquid mixture containing an alcohol and water, particularly a liquid mixture in which the alcohol concentration is moderate (for example, 20 wt % to 80 wt %). Moreover, according to studies by the present inventors, the water separation performance, which may be high at the beginning of use, of conventional separation membranes including a polyimide greatly decreases through long-term use.

Therefore, the present invention aims to provide a separation membrane suitable for separating water from a liquid mixture containing an alcohol and water, the separation membrane being capable of reducing a decrease in separation performance regardless of long-term use.

Solution to Problem

The present invention provides a separation membrane for separating water from a liquid mixture containing an alcohol and water, the separation membrane including:
a polyimide, wherein
the polyimide has a structural unit X represented by the following formula (1) and a structural unit Y represented by the following formula (2):

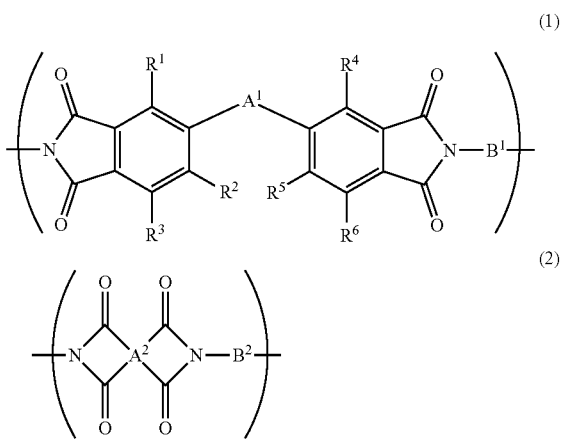

in the formula (1), $A^1$ is a linking group including no arylene group in a main chain and having a solubility parameter, in accordance with a Fedors method, of more than 5.0 $(cal/cm^3)^{1/2}$, $B^1$ is a divalent organic group, and $R^1$ to $R^6$ are each independently a hydrogen atom, a halogen atom, a hydroxyl group, a sulfonic acid group, an alkoxy group having 1 to 30 carbon atoms, or a hydrocarbon group having 1 to 30 carbon atoms, and
in the formula (2), $A^2$ is a tetravalent organic group including an arylene group and $B^2$ is a divalent organic group.

Advantageous Effects of Invention

The present invention can provide a separation membrane suitable for separating water from a liquid mixture containing an alcohol and water, the separation membrane being capable of reducing a decrease in separation performance regardless of long-term use.

DESCRIPTION OF EMBODIMENTS

Hereinafter, the present invention will be described in detail. The following description is not intended to limit the present invention to a specific embodiment.

Embodiment of Separation Membrane

Figure 1:
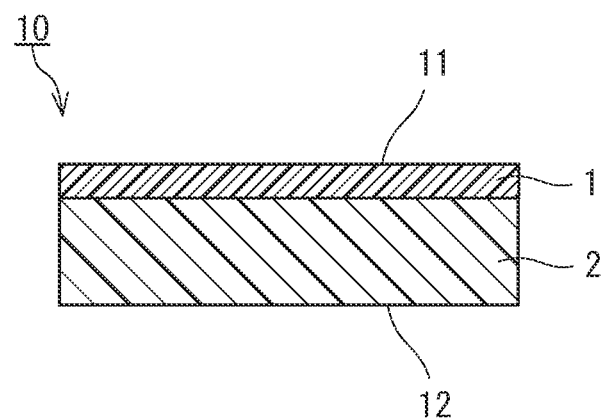
FIG. 1 is a cross-sectional view of a separation membrane according to an embodiment of the present invention.

As shown in FIG. 1, a separation membrane 10 of the present embodiment includes a separation functional layer 1. The separation functional layer 1 allows water contained in a liquid mixture to permeate therethrough preferentially. The separation membrane 10 may further include a porous support member 2 supporting the separation functional layer 1.

(Separation Functional Layer)

The separation functional layer 1 includes a polyimide (P). The polyimide (P) includes a structural unit X represented by the following formula (1) and a structural unit Y represented by the following formula (2).

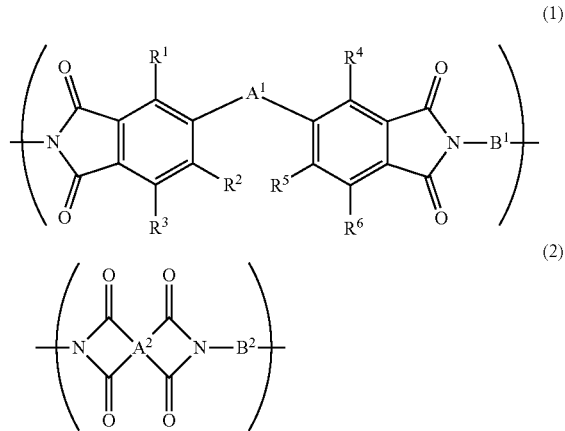

First, the structural unit X will be described. In the formula (1), $A^1$ is a linking group including no arylene group in a main chain and having a solubility parameter, in accordance with a Fedors method, of more than 5.0 (cal/cm$^3$)$^{1/2}$. Herein, the term "main chain" means a bonding chain bonding two phthalimide structures linked by $A^1$. The term "arylene group" means a divalent aromatic group having an aromatic ring formed of a carbon atom. It is preferable that $A^1$ also include no heteroarylene group in its main chain. The term "heteroarylene group" means a divalent aromatic group having a heteroaromatic ring including a hetero atom such as an oxygen atom, a nitrogen atom, or a sulfur atom. In particular, $A^1$ is preferably free of an aromatic ring and a heteroaromatic ring, and is more preferably free of a ring structure.

Herein, a solubility parameter in accordance with the Fedors method is also referred to as an SP value. A solubility parameter in accordance with the Fedors method can be calculated by the following formula. It should be noted that in this formula, δi is the SP value of an atom or atomic group of an i component. The symbol Δei is an evaporation energy of the atom or atomic group of the i component. The symbol Δvi is a molar volume of the atom or atomic group of the i component.

$$\delta i [(cal/cm^3)^{1/2}] = (\Delta ei/\Delta vi)^{1/2}$$

The details of a solubility parameter in accordance with the Fedors method is disclosed, for example, in Robert F. Fedors "Polymer Engineering and Science" 1974, vol. 14, the second issue, pp. 147-154.

The SP value of $A^1$ is more than 5.0 (cal/cm$^3$)$^{1/2}$. Such a high SP value of $A^1$ is likely to facilitate water penetration into the separation functional layer 1. The SP value of $A^1$ is preferably 8.5 (cal/cm$^3$)$^{1/2}$ or more, more preferably 11.0 (cal/cm$^3$)$^{1/2}$ or more, and even more preferably 12.0 (cal/cm$^3$)$^{1/2}$ or more. The upper limit of the SP value of $A^1$ is not particularly limited, and may be, for example, 30.0 (cal/cm$^3$)$^{1/2}$ or 14.0 (cal/cm$^3$)$^{1/2}$. The SP value of $A^1$ is preferably, for example, 12.68 (cal/cm$^3$)$^{1/2}$.

$A^1$ includes, for example, at least one selected from the group consisting of an oxygen atom, a nitrogen atom, a sulfur atom, and a silicon atom. $A^1$ preferably includes at least one selected from the group consisting of an oxygen atom and a nitrogen atom, and particularly preferably includes an oxygen atom. $A^1$ includes, for example, at least one functional group selected from the group consisting of an ether group, a carbonyl group, a hydroxyl group, an amide group, a thioether group, and a sulfonyl group. Specific examples of the carbonyl group include an ester group and a ketone group. $A^1$ preferably includes at least one selected from the group consisting of an ether group and an ester group, and more preferably includes an ester group.

$A^1$ may include another group, such as a hydrocarbon group, in addition to the above functional group(s). The number of carbon atoms in the hydrocarbon group is not particularly limited, and is, for example, 1 to 15, preferably 1 to 5, and more preferably 1 to 3. $A^1$ preferably includes a divalent hydrocarbon group, particularly an alkylene group. Examples of the divalent hydrocarbon group include a methylene group, an ethylene group, a propane-1,3-diyl group, a propane-2,2-diyl group, a butane-1,4-diyl group, a pentane-1,5-diyl group, and a 2,2-dimethylpropane-1,3-diyl group, and the divalent hydrocarbon group is preferably an ethylene group. At least one hydrogen atom included in each of these hydrocarbon groups may be substituted by a halogen atom.

$A^1$ is, for example, a linking group represented by a general formula —O—$R^{17}$—O— or a general formula —COO—$R^{18}$—OOC—. In particular, $A^1$ is preferably the linking group represented by the general formula —COO—$R^{18}$—OOC—. $R^{17}$ and $R^{18}$ are each a divalent hydrocarbon group having 1 to 15 carbon atoms. Examples of the divalent hydrocarbon group include those described above.

$A^1$ does not need to include the above functional groups as long as $A^1$ is a linking group having an SP value of more than 5.0 (cal/cm$^3$)$^{1/2}$. Examples of such $A^1$ include an alkylene group. The number of carbon atoms in the alkylene group is not particularly limited, and may be, for example, 1 to 15 or 1 to 5. The alkylene group may be branched, but is preferably linear. A part of hydrogen atoms in the alkylene group may be substituted by a halogen atom. However, the alkylene group is preferably an unsubstituted alkylene group, namely, a linear or branched alkylene group.

In the formula (1), the number of atoms constituting a bonding chain, among bonding chains bonding two phthalimide structures linked to each other by $A^1$, that is composed of a least number of atoms is, for example, 2 or more, preferably 4 or more, and more preferably 6 to 11. Herein, the bonding chain composed of a least number of atoms is also referred to as "shortest bonding chain". In the case where $A^1$ is a propane-1,3-diyl group, the number of atoms constituting the shortest bonding chain bonding two phthalimide structures linked to each other by $A^1$ is 3. In the case where $A^1$ is a propane-2,2-diyl group, the number of atoms constituting the shortest bonding chain bonding two phthalimide structures linked to each other by $A^1$ is 1.

$A^1$ may be one of linking groups 1 to 16 shown in Table 1 below. Table 1 also shows the chemical structure, the SP value, and the number of atoms constituting the shortest bonding chain of each of the linking groups 1 to 16. $A^1$ is preferably the linking group 12. When $A^1$ is the linking group 12, the polyimide (P) easily dissolves in a polar organic solvent, such as N-methyl-2-pyrrolidone (NMP) or 1,3-dioxolane, and is easily adopted in a method desirable for manufacturing the separation functional layer 1.

water penetration into the separation functional layer 1. The SP value of $B^3$ is preferably 9.0 $(cal/cm^3)^{1/2}$ or more, more preferably 11.0 $(cal/cm^3)^{1/2}$ or more, even more preferably 12.0 $(cal/cm^3)^{1/2}$ or more, and particularly preferably 14.0 $(cal/cm^3)^{1/2}$ or more. The upper limit of the SP value of $B^3$

TABLE 1

|   | —$A^1$— | SP value [$(cal/cm^3)^{1/2}$] | Number of atoms constituting shortest bonding chain |
|---|---|---|---|
| 1 | —$CF_2$— | 6.66 | 1 |
| 2 | —$CHC(CH_3)_3$— | 7.52 | 1 |
| 3 | —$CH_2$— | 8.56 | 1 |
| 4 | —$(CH_2)_5$— | 8.56 | 5 |
| 5 | —O—$CH_2$—$C(CH_3)_2$—$CH_2$—O— | 8.65 | 5 |
| 6 | —O—$(CH_2)_5$—O— | 9.23 | 7 |
| 7 | —O—$(CH_2)_4$—O— | 9.37 | 6 |
| 8 | —O—$CH_2$—O— | 10.83 | 3 |
| 9 | ![structure] | 11.52 | 8 |
| 10 | ![structure] | 12.00 | 7 |
| 11 | —$SO_2$— | 12.47 | 1 |
| 12 | ![structure] | 12.68 | 6 |
| 13 | —O— | 14.51 | 1 |
| 14 | —S— | 16.79 | 1 |
| 15 | —CO— | 19.60 | 1 |
| 16 | —CONH— | 29.02 | 2 |

In the formula (1), $R^1$ to $R^6$ are each independently a hydrogen atom, a halogen atom, a hydroxyl group, a sulfonic acid group, an alkoxy group having 1 to 30 carbon atoms, or a hydrocarbon group having 1 to 30 carbon atoms. $R^1$ to $R^6$ are each preferably a hydrogen atom. The alkoxy group or hydrocarbon group represented by $R^1$ to $R^6$ may each be linear or branched. The number of carbon atoms in the alkoxy group or hydrocarbon group is preferably 1 to 20, more preferably 1 to 10, and particularly preferably 1 to 5. Examples of the alkoxy group include a methoxy group, an ethoxy group, and a propoxy group. Examples of the hydrocarbon group include a methyl group, an ethyl group, and a propyl group. At least one hydrogen atom included in the alkoxy group or hydrocarbon group may be substituted by a halogen atom.

$R^2$ and $R^3$ may be bonded to each other to form a ring structure, and $R^5$ and $R^6$ may be bonded to each other to form a ring structure. Each ring structure is, for example, a benzene ring.

In the formula (1), $B^1$ is a divalent organic group. $B^1$ is, for example, represented by the following formula (3).

-$Ar^1$-$B^3$-$Ar^2$-   (3)

In the formula (3), $B^3$ is a linking group. The SP value of this linking group is, for example, more than 8.56 $(cal/cm^3)^{1/2}$. Such a high SP value of $B^3$ is likely to facilitate is not particularly limited, and may be, for example, 30.0 $(cal/cm^3)^{1/2}$. The SP value of $B^3$ is preferably, for example, 14.51 $(cal/cm^3)^{1/2}$.

$B^3$ includes, for example, at least one selected from the group consisting of an oxygen atom, a nitrogen atom, a sulfur atom, and a silicon atom. $B^3$ preferably includes at least one selected from the group consisting of an oxygen atom and a nitrogen atom, and particularly preferably includes an oxygen atom. $B^3$ includes, for example, at least one functional group selected from the group consisting of an ether group, a carbonyl group, a hydroxyl group, an amide group, a thioether group, and a sulfonyl group. $B^3$ preferably includes at least one selected from the group consisting of an ether group and a carbonyl group, and more preferably includes an ether group.

$B^3$ may include another group, such as a hydrocarbon group, in addition to the above functional group(s). Examples of the hydrocarbon group include those described above for $A^1$. $B^3$ may be identical to or different from $A^1$. Moreover, in $B^3$, the hydrocarbon group may include an arylene group. Examples of the hydrocarbon group including an arylene group include a 1,4-phenylene group, a 2,5-di-tert-butyl-1,4-phenylene group, a 1-methyl-1,1-ethanediylbis(1,4-phenylene) group, a biphenyl-4,4'-diyl group.

In the formula (3), the number of atoms constituting a bonding chain (shortest bonding chain), among bonding chains bonding $Ar^1$ and $Ar^2$ linked to each other by $B^3$, that is composed of a least number of atoms is, for example, 1 or more. The upper limit of the number of atoms constituting the shortest bonding chain is not particularly limited, and may be 12 or 5. The number of atoms constituting the shortest bonding chain is preferably 1.

$B^3$ may be one of the linking groups 1 to 16 shown in Table 1 above or one of linking groups 17 to 26 shown in Table 2 below. $B^3$ is preferably one of the linking groups 5 to 26, more preferably the linking group 13, 18, or 22, and particularly preferably the linking group 13.

In the formula (3), $Ar^1$ and $Ar^2$ are each a divalent aromatic group. The divalent aromatic group has an aromatic ring formed of a carbon atom or a heteroaromatic ring including a hetero atom, and preferably has an aromatic ring formed of a carbon atom. The nitrogen atom included in the phthalimide structure in the formula (1) is preferably directly bonded to the aromatic ring (or the heteroaromatic ring) included in $Ar^1$ or the aromatic ring (or the heteroaromatic ring) included in $Ar^2$. In the formula (3), $B^3$ may be bonded directly to both the aromatic ring (or the heteroaromatic ring) included in $Ar^1$ and the aromatic ring (or the heteroaromatic ring) included in $Ar^2$.

In $Ar^1$ and $Ar^2$, the aromatic ring (or the heteroaromatic ring) may be polycyclic, but is preferably monocyclic. The number of carbon atoms in the aromatic ring (or the heteroaromatic ring) is not particularly limited, and may be, for example, 4 to 14 or 6 to 10. Examples of the aromatic ring and the heteroaromatic ring include a benzene ring, a naphthalene ring, an anthracene ring, a phenanthrene ring, a furan ring, a pyrrole ring, a pyridine ring, and a thiophene ring.

In $Ar^1$ and $Ar^2$, the aromatic ring (or the heteroaromatic ring) may be unsubstituted or substituted. Examples of the substituent include a halogen atom, a hydroxyl group, a sulfonic acid group, an alkoxy group having 1 to 30 carbon atoms, and a hydrocarbon group having 1 to 30 carbon atoms. Examples of the alkoxy group and the hydrocarbon group include those described above for $R^1$ to $R^6$. When the aromatic ring (or the heteroaromatic ring) has a plurality of substituents, the substituents may be identical to or different from each other.

$Ar^1$ and $Ar^2$ are each preferably an optionally substituted phenylene group or an optionally substituted naphthalenediyl group. When $Ar^1$ and $Ar^2$ are the optionally substituted phenylene groups, $Ar^1$ and $Ar^2$ are each preferably represented by the following formula (4).

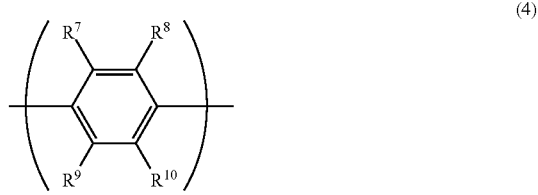

In the formula (4), $R^7$ to $R^{10}$ are each independently a hydrogen atom, a halogen atom, a hydroxyl group, a sulfonic acid group, an alkoxy group having 1 to 30 carbon atoms, or a hydrocarbon group having 1 to 30 carbon atoms. Examples of the alkoxy group and the hydrocarbon group include those described above for $R^1$ to $R^6$. $R^7$ to $R^{10}$ are each preferably a hydrogen atom. The formula (4) represents a p-phenylene structure. A polyimide having the p-phenylene structure is sterically less bulky than a polyimide having an o-phenylene structure or an m-phenylene structure, and is suitable for improving the separation performance of the separation membrane.

The optionally substituted naphthalenediyl group represented by $Ar^1$ and $Ar^2$ has, for example, a naphthalene-2,6-diyl structure, a naphthalene-1,4-diyl structure, a naphthalene-1,5-diyl structure, or a naphthalene-1,8-diyl structure. A specific example of the optionally substituted naphthalenediyl group is a naphthalene-2,6-diyl group.

$Ar^1$ and $Ar^2$ may be identical to or different from each other. In one example, $Ar^1$ may be a naphthalene-2,6-diyl group and $Ar^2$ may be a p-phenylene group.

$B^1$ in the formula (1) is not limited to the structure represented by the formula (3). For example, $B^1$ may be a divalent aromatic group such as an optionally substituted phenylene group or an optionally substituted biphenylene group. Examples of the divalent aromatic group include those described above for $Ar^1$ and $Ar^2$. $B^1$ may be, for example, a 5-carboxy-1,3-phenylene group.

The structural unit X is preferably represented by the following formula (6).

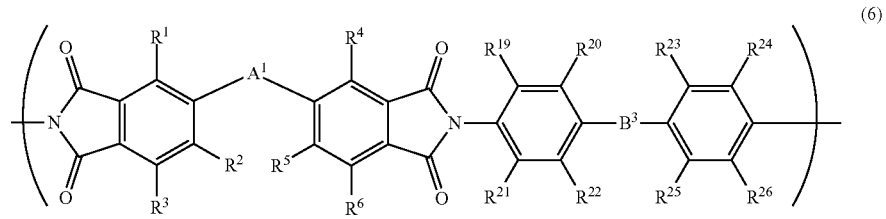

In the formula (6), $A^1$, $B^3$, and $R^1$ to $R^6$ are identical to those described above for the formulae (1) and (3). $R^{19}$ to $R^{26}$ are each independently a hydrogen atom, a halogen atom, a hydroxyl group, a sulfonic acid group, an alkoxy group having 1 to 30 carbon atoms, or a hydrocarbon group having 1 to 30 carbon atoms. Examples of the alkoxy group and the hydrocarbon group include those described above for $R^1$ to $R^6$. $R^{19}$ to $R^{26}$ are each preferably a hydrogen atom.

The polyimide (P) includes, for example, the structural unit X as its main component. Herein, the term "main component" means a structural unit whose content is highest in a polymer on a molar basis. A content of the structural unit X in the polyimide (P) is, for example, 40 mol % or more, preferably 50 mol % or more, and more preferably 60 mol % or more. The content of the structural unit X is preferably 40 mol % to 80 mol %.

Next, the structural unit Y will be described. The structural unit Y is a structural unit different from the structural unit X. In the formula (2), $A^2$ is a tetravalent organic group including an arylene group. An aromatic ring included in the arylene group may be polycyclic, but is preferably monocyclic. The number of carbon atoms in the aromatic ring is, for example, but not particularly limited to, 6 to 14. Examples of the aromatic ring include a benzene ring, a naphthalene ring, an anthracene ring, and a phenanthrene ring.

In $A^2$, the aromatic ring included in the arylene group may be unsubstituted or substituted. Examples of the substituent include a halogen atom, a hydroxyl group, a sulfonic acid group, an alkoxy group having 1 to 30 carbon atoms, and a hydrocarbon group having 1 to 30 carbon atoms. Examples of the alkoxy group and the hydrocarbon group include those described above for $R^1$ to $R^6$. When the aromatic ring has a plurality of substituents, the substituents may be identical to or different from each other.

In $A^2$, the arylene group is preferably an optionally substituted phenylene group or an optionally substituted naphthalenediyl group, and more preferably an optionally substituted phenylene group. The arylene group being an optionally substituted phenylene group is preferably represented by the above formula (4).

$A^2$ may include, in addition to the arylene group, at least one selected from the group consisting of an oxygen atom, a nitrogen atom, a sulfur atom, and a silicon atom. $A^2$ preferably includes at least one selected from the group consisting of an oxygen atom and a nitrogen atom, and particularly preferably includes an oxygen atom. $A^2$ includes, for example, at least one functional group selected from the group consisting of an ether group, a carbonyl group, a hydroxyl group, an amide group, a thioether group, and a sulfonyl group, preferably includes at least one selected from the group consisting of an ether group and an ester group, and more preferably includes an ether group.

In the formula (2), $B^2$ is a divalent organic group. $B^2$ may be any structure described above for $B^1$. $B^2$ may be identical to or different from $B^1$. In the present embodiment, $B^1$ and/or $B^2$ is preferably represented by the above formula (3), and, particularly preferably, both $B^1$ and $B^2$ are represented by the above formula (3).

The structural unit Y is preferably represented by the following formula (5).

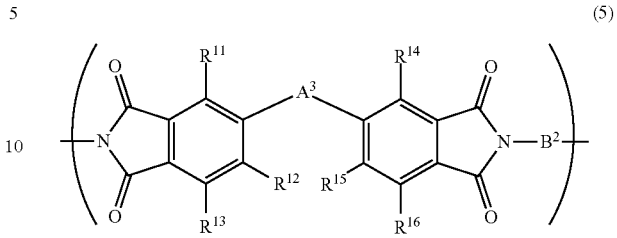

(5)

In the formula (5), $A^3$ is a divalent linking group including an arylene group in a main chain. Examples of the arylene group in $A^3$ include those described above for $A^2$. Like $A^2$, $A^3$ may include, in addition to the arylene group, at least one selected from the group consisting of an oxygen atom, a nitrogen atom, a sulfur atom, and a silicon atom. $A^3$ preferably includes at least one selected from the group consisting of an oxygen atom and a nitrogen atom, and particularly preferably includes an oxygen atom. $A^3$ includes, for example, at least one functional group selected from the group consisting of an ether group, a carbonyl group, a hydroxyl group, an amide group, a thioether group, and a sulfonyl group, preferably includes at least one selected from the group consisting of an ether group and an ester group, and more preferably includes an ether group.

$A^3$ is, for example, a linking group represented by a general formula —O—$R^{27}$—O— or a general formula —COO—$R^{28}$—OOC—. In particular, $A^3$ is preferably the linking group represented by the general formula —O—$R^{27}$—O—. $R^{27}$ and $R^{28}$ are each a divalent hydrocarbon group including an arylene group in its main chain. The number of carbon atoms in this hydrocarbon group is, for example, 6 to 15. Examples of the hydrocarbon group include a 1,4-phenylene group, a 2,5-di-tert-butyl-1,4-phenylene group, a 1-methyl-1,1-ethanediylbis(1,4-phenylene) group, and a biphenyl-4,4'-diyl group.

In the formula (5), the SP value of the linking group represented by $A^3$ is, for example, more than 5.0 $(cal/cm^3)^{1/2}$. Such a high SP value of $A^3$ is likely to facilitate water penetration into the separation functional layer 1. The SP value of $A^3$ is preferably 8.5 $(cal/cm^3)^{1/2}$ or more and more preferably 11.0 $(cal/cm^3)^{1/2}$ or more. The upper limit of the SP value of $A^3$ is not particularly limited, and may be, for example, 30.0 $(cal/cm^3)^{1/2}$ or 14.0 $(cal/cm^3)^{1/2}$. The SP value of $A^3$ is preferably, for example, 11.02 $(cal/cm^3)^{1/2}$.

In the formula (5), the number of atoms constituting a bonding chain, among bonding chains bonding two phthalimide structures linked to each other by $A^3$, that is composed of a least number of atoms is, for example, 6 or more and preferably 10 or more. The upper limit of the number of these atoms is, for example, but not particularly limited to, 15.

$A^3$ may be one of the linking groups 17 to 26 shown in Table 2 below. Table 2 also shows the chemical structure, the SP value, and the number of atoms constituting the shortest bonding chain of each of the linking groups 17 to 26. $A^3$ is preferably the linking group 19. When $A^3$ is the linking group 19, the polyimide (P) easily dissolves in a polar organic solvent, such as N-methyl-2-pyrrolidone (NMP) or 1,3-dioxolane, and is easily adopted in a method desirable for manufacturing the separation functional layer 1.

TABLE 2
| —A³— | | SP value [(cal/cm³)^(1/2)] | Number of atoms constituting shortest bonding chain |
|---|---|---|---|
| 17 | 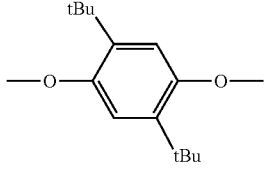 | 9.51 | 6 |
| 18 | 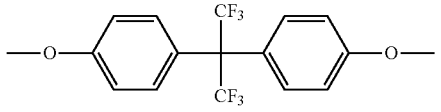 | 9.62 | 11 |
| 19 | 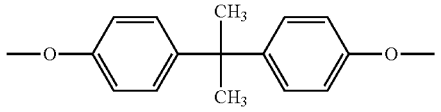 | 11.02 | 11 |
| 20 | 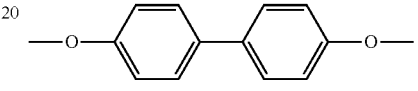 | 12.25 | 10 |
| 21 | 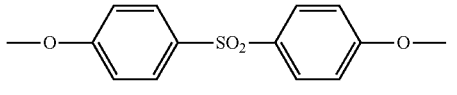 | 12.29 | 11 |
| 22 | 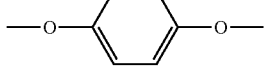 | 12.40 | 6 |
| 23 | 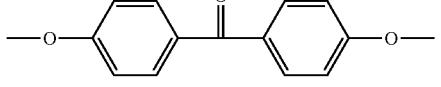 | 13.06 | 11 |
| 24 | 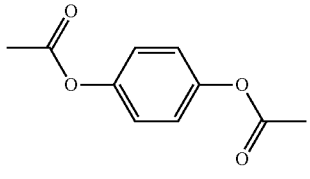 | 13.55 | 8 |
| 25 | 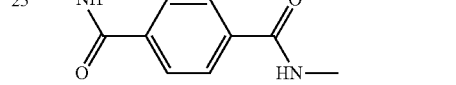 | 18.19 | 8 |
| 26 | 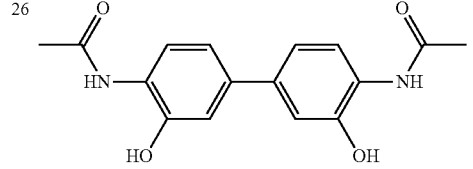 | 20.74 | 12 |

In the formula (5), $R^{11}$ to $R^{16}$ are each independently a hydrogen atom, a halogen atom, a hydroxyl group, a sulfonic acid group, an alkoxy group having 1 to 30 carbon atoms, or a hydrocarbon group having 1 to 30 carbon atoms. Examples of the alkoxy group and the hydrocarbon group include those described above for $R^1$ to $R^6$. $R^{12}$ and $R^{13}$ may be bonded to each other to form a ring structure, and $R^{15}$ and $R^{16}$ may be bonded to each other to form a ring structure. Each ring structure is, for example, a benzene ring.

In the formula (5), $B^2$ is identical to that described above for the formula (2).

The structural unit Y is particularly preferably represented by the following formula (7).

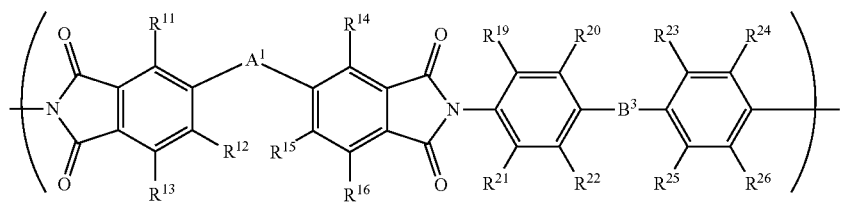

(7)

In the formula (7), $A^3$ and $R^{11}$ to $R^{16}$ are identical to those described above for the formula (5). $B^3$ and $R^{19}$ to $R^{26}$ are identical to those described above for the formula (6).

A content of the structural unit Y in the polyimide (P) is, for example, 60 mol % or less, preferably 50 mol % or less, and more preferably 40 mol % or less. The content of the structural unit Y is preferably 20 mol % to 60 mol %.

In one example, the polyimide (P) is obtained by a reaction of a tetracarboxylic dianhydride (C1) represented by the following formula (8), a tetracarboxylic dianhydride (C2) represented by the following formula (9), a diamine compound (D1) represented by the following formula (10), and a diamine compound (D2) represented by the following formula (11). In the formula (8), $A^1$ and $R^1$ to $R^6$ are identical to those described above for the formula (1). In the formula (9), $A^2$ is identical to that described above for the formula (2). In the formula (10), $B^1$ is identical to that described above for the formula (1). In the formula (11), $B^2$ is identical to that described above for the formula (2).

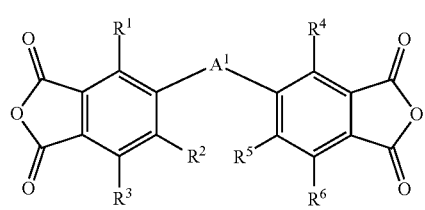

(8)

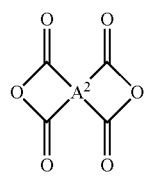

(9)

$$H_2N-B^1-NH_2 \quad (10)$$

$$H_2N-B^2-NH_2 \quad (11)$$

The tetracarboxylic dianhydride (C2) is preferably a tetracarboxylic dianhydride (C3) represented by the following formula (12). In the formula (12), $A^3$ and $R^{11}$ to $R^{16}$ are identical to those described above for the formula (5).

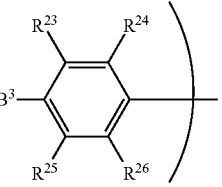

(12)

The diamine compound (D1) and/or the diamine compound (D2) is preferably a diamine compound (D3) represented by the following formula (13). In the formula (13), $B^3$, $Ar^1$, and $Ar^2$ are identical to those described above for the formula (3).

$$H_2N\text{-}Ar^1\text{-}B^3\text{-}Ar^2\text{-}NH_2 \quad (13)$$

The polyimide (P) may include a structural unit derived from a tetracarboxylic dianhydride other than the tetracarboxylic dianhydrides (C1) and (C2), but is preferably free of such a structure. The other tetracarboxylic dianhydride is not particularly limited, and a known tetracarboxylic dianhydride can be used. Example of the other tetracarboxylic dianhydride include pyromellitic dianhydride and 4,4'-(hexafluoroisopropylidene)diphthalic anhydride.

In the polyimide (P), a sum of a ratio of a structural unit derived from the tetracarboxylic dianhydride (C1) to structural units derived from all tetracarboxylic dianhydrides and a ratio of a structural unit derived from the tetracarboxylic dianhydride (C2) to structural units derived from all tetracarboxylic dianhydrides is, for example, 60 mol % or more, preferably 80 mol % or more, and more preferably 90 mol % or more. The sum may be 100 mol %.

The polyimide (P) may include a structural unit derived from a diamine compound other than the diamine compound (D3). The polyimide (P) does not need to include a structural unit derived from a diamine compound other than the diamine compound (D3). The other diamine compound is not particularly limited, and a known diamine compound can be used. Examples of the other diamine compound include phenylenediamine, diaminobenzoic acid, diaminobiphenyl, and diaminodiphenylmethane. In one example, the polyimide (P) may include a structural unit derived from diaminobenzoic acid (such as 3,5-diaminobenzoic acid). The polyimide (P) including the structural unit derived from diaminobenzoic acid is suitable for increasing a flux of water permeating through the separation membrane 10.

In the polyimide (P), a ratio of a structural unit derived from the diamine compound (D3) to structural units derived from all diamine compounds is, for example, 50 mol % or more, preferably 70 mol % or more, and more preferably 90 mol % or more. The ratio may be 100 mol %.

The weight-average molecular weight of the polyimide (P) is not particularly limited, and is, for example, $5 \times 10^4$ or more, preferably $7 \times 10^4$ or more, more preferably $10 \times 10^4$ or more, and even more preferably $15 \times 10^4$ or more. The greater the weight-average molecular weight of the polyimide (P), the more likely the separation membrane 10 has a high durability. The upper limit of the weight-average molecular weight of the polyimide (P) is not particularly limited, and is, for example, $1 \times 10^6$.

A content of the polyimide (P) in the separation functional layer 1 is, for example, 50 wt % or more, preferably 60 wt % or more, more preferably 70 wt % or more, still more preferably 80 wt % or more, and particularly preferably 90 wt % or more. The separation functional layer 1 is, for example, formed substantially of the polyimide (P).

The separation functional layer 1 may include a filler in addition to the polyimide (P). The filler is, for example, hydrophilic and porous. The filler as just mentioned is suitable for increasing the flux of water permeating through the separation membrane 10 without greatly decreasing the separation performance of the separation membrane 10.

The filler includes, for example, at least one selected from the group consisting of zeolite and a metal organic framework (MOF). From the viewpoint of the durability against water, the filler preferably includes the metal organic framework, but may be free of the metal organic framework. Examples of the zeolite include molecular sieves 3A, 4A, 5A, and 13X.

The metal organic framework is also referred to as a porous coordination polymer (PCP). The metal organic framework includes, for example, a metal ion and an organic ligand. Examples of the metal ion include a Co ion, a Ni ion, a Zn ion, a Mg ion, a Zr ion, and a Cu ion. The organic ligand does not need to have a polar group, but preferably has a polar group. Examples of the polar group include an aldehyde group, an amino group, an amide group, a hydroxyl group, a carboxyl group, and a nitro group. The organic ligand includes, for example, an aromatic ring. Examples of the aromatic ring included in the organic ligand include a benzene ring and an imidazole ring. Examples of the organic ligand include 2-hydroxymethylimidazole, 2-formylimidazole, terephthalic acid, 2-hydroxyterephthalic acid, 2,5-dihydroxyterephthalic acid, and 2-aminoterephthalic acid.

Examples of the metal organic framework include ZIF-90, ZIF-91, UiO-66, UiO-66-NH$_2$, UiO-66-OH, UiO-66-NO$_2$, UiO-66-COOH, HKUST-1, and MOF-74 (M=Co, Ni, Zn, Mg, etc.). From the viewpoint of increasing the flux of water permeating through the separation membrane 10, the metal organic framework preferably includes at least one selected from the group consisting of ZIF-90, UiO-66-NH$_2$, UiO-66-OH, UIO-66-NO$_2$, UiO-66-COOH, and MOF-74 (Ni). More preferably, the metal organic framework includes UiO-66-COOH.

As the filler, a filler that can adsorb water is suitable. In particular, a filler that adsorbs water better than it adsorbs ethanol is suitable as the filler. A ratio R1 of an adsorption amount Q2 of water adsorbed by the filler under water vapor at 25° C. and 3.2 kPa to an adsorption amount Q1 of ethanol adsorbed by the filler under an ethanol atmosphere at 25° C. and 7.4 kPa is, for example, 2.0 or more and preferably 3.0 or more. The upper limit of the ratio R1 is, for example, but not particularly limited to, 5.0. The ratio R1 is used as an index of the hydrophilicity of the filler in some cases. Herein, the term "adsorption amount" means a value obtained by converting a volume of a gas that 1 g of the filler has adsorbed into a volume of the gas in a standard state (298 K, 1 atm).

The adsorption amount Q1 of ethanol adsorbed by the filler can be determined by the following method. First, the filler is pretreated by being heated under a decompressed atmosphere. The pretreatment may be carried out under a vacuum atmosphere. The pretreatment is carried out at a temperature of 100° C. or higher, for example. The duration of the pretreatment is, for example, but not particularly limited to, 1 hour or longer. Next, the filler is placed in a known vapor adsorption amount measuring apparatus such as BELSORP-max II available from MicrotracBEL Corp. Next, gaseous ethanol is introduced into the measuring apparatus at a measurement temperature of 25° C. The introduced gaseous ethanol is adsorbed by the filler. The gaseous ethanol is introduced until the pressure of ethanol in the measuring apparatus reaches 7.4 kPa. The pressure of 7.4 kPa is equivalent to an equilibrium vapor pressure (a saturation vapor pressure) of ethanol at 25° C. After adsorption of ethanol by the filler is confirmed to have reached a state of equilibrium, the adsorption amount of the ethanol adsorbed by the filler is determined. The fact that adsorption of ethanol by the filler has reached a state of equilibrium can be confirmed from a pressure variation of the ethanol inside the measuring apparatus. For example, when the pressure variation of the ethanol inside the measuring apparatus is 40 Pa or less for 500 seconds, adsorption of ethanol by the filler can be considered to have reached a state of equilibrium. The ethanol adsorption amount determined by the above method can be assumed as the adsorption amount Q1.

The adsorption amount Q2 of water adsorbed by the filler can be determined by the following method. First, the filler is subjected to the above pretreatment. The filler is placed in a vapor adsorption amount measuring apparatus. Next, water vapor is introduced into the measuring apparatus at a measurement temperature of 25° C. The water vapor is introduced until the pressure of water vapor in the measuring apparatus reaches 3.2 kPa. The pressure of 3.2 kPa is equivalent to an equilibrium vapor pressure of water at 25° C. After adsorption of water by the filler is confirmed to have reached a state of equilibrium, the adsorption amount of water adsorbed by the filler is determined. The determined water adsorption amount can be assumed as the adsorption amount Q2.

The adsorption amount Q1 of ethanol adsorbed by the filler is, for example, 200 cm$^3$/g or less. The lower limit of the adsorption amount Q1 is not particularly limited, and may be 90 cm$^3$/g or 100 cm$^3$/g. The adsorption amount Q2 of water adsorbed by the filler is, for example, 300 cm$^3$/g or more, and may be, in some cases, 350 cm$^3$/g or more, 450 cm$^3$/g or more, 500 cm$^3$/g or more, or 550 cm$^3$/g or more. The upper limit of the adsorption amount Q2 is, for example, but not particularly limited to, 800 cm$^3$/g.

The filler may be a filler for which a ratio R2 of a BET (Brunauer-Emmett-Teller) specific surface area S2 obtained by water vapor adsorption to a BET specific surface area S1 obtained by nitrogen gas adsorption is 0.005 or more. The ratio R2 is used as an index of the hydrophilicity of the filler in some cases. For the filler, the ratio R2 is, for example, 0.01 or more, preferably 0.1 or more, more preferably 0.2 or more, and even more preferably 0.3 or more. The ratio R2 may be 25 or less, 10 or less, 1.0 or less, or 0.6 or less.

For the filler, the BET specific surface area S1 obtained by nitrogen gas adsorption is, for example, 1500 m$^2$/g or less and preferably 1000 m$^2$/g or less, and may be, in some cases, 900 m$^2$/g or less. The specific surface area S1 may be 30 m$^2$/g or more or 400 m$^2$/g or more. For the filler, the BET specific surface area S2 obtained by water vapor adsorption is, for example, 10 m$^2$/g or more, preferably 100 m$^2$/g or more, and more preferably 150 m$^2$/g or more, and may be, in some cases, 200 m$^2$/g or more. The specific surface area S2 may be 1000 m$^2$/g or less, 600 m$^2$/g or less, or 400 m$^2$/g or less.

The shape of the filler is not particularly limited, and is, for example, a particulate shape. Herein, the term "particulate" includes a spherical shape, an elliptical shape, a flaky shape, a fibrous shape, and the like. The average particle size of the filler is, for example, but not particularly limited to, 5 nm to 10000 nm. The average particle size of the filler can be determined, for example, by the following method. First, a cross section of the separation functional layer 1 is observed with a transmission electron microscope. In the obtained electron microscope image, the area of a specific filler is calculated by image processing. The diameter of a circle having the same area as the calculated area is regarded as the particle size (the diameter of the particle) of the specific filler. The particle size is calculated for any number (at least 50) of the fillers, and the average of the calculated values is regarded as the average particle size of the fillers.

A content of the filler in the separation functional layer 1 may be, for example, 1 wt % or more, 5 wt % or more, 10 wt % or more, 15 wt % or more, or 20 wt % or more. The content of the filler in the separation functional layer 1 may be 30 wt % or less.

The thickness of the separation functional layer 1 is not particularly limited, and is, for example, 4 μm or less, preferably 2 μm or less, and more preferably 1.5 μm or less. The thickness of the separation functional layer 1 may be 0.05 μm or more or 0.1 μm or more.

(Porous Support Member)

The porous support member 2 is not particularly limited as long as it can support the separation functional layer 1. Examples of the porous support member 3 include: a nonwoven fabric; porous polytetrafluoroethylene; an aromatic polyamide fiber; a porous metal; a sintered metal; a porous ceramic; a porous polyester; porous nylon; an activated carbon fiber; latex; silicone; silicone rubber; a permeable (porous) polymer including at least one selected from the group consisting of polyvinyl fluoride, polyvinylidene fluoride, polyurethane, polypropylene, polyethylene, polycarbonate, polysulfone, polyether ether ketone, polyacrylonitrile, polyimide, and polyphenylene oxide; a metallic foam having an open cell or a closed cell; a polymer foam having an open cell or a closed cell; silica; a porous glass; and a mesh screen. The porous support member 2 may be a combination of two or more of these materials.

The porous support member 2 has, for example, an average pore diameter of 0.01 to 0.4 μm. The thickness of the porous support 2 is not particularly limited, and is, for example, 10 μm or more, preferably 20 μm or more, and more preferably 50 μm or more. The thickness of the porous support 2 is, for example, 300 μm or less, preferably 200 μm or less, and more preferably 75 μm or less.

(Separation Membrane Manufacturing Method)

The separation membrane 10 can be produced by forming the separation functional layer 1 on the porous support member 2. The separation functional layer 1 can be produced by the following method, for example. First, a diamine compound for forming the polyimide (P) is dissolved in a solvent to obtain a solution. Examples of the solvent include polar organic solvents such as N-methyl-2-pyrrolidone and 1,3-dioxolane.

Next, a tetracarboxylic dianhydride is added gradually to the obtained solution. This causes a reaction of the tetracarboxylic dianhydride and the diamine compound to form polyamic acid. The addition of the tetracarboxylic dianhydride is carried out, for example, under stirring at a temperature equal to or lower than room temperature (25° C.) for 3 to 20 hours.

The polyamic acid is subsequently imidized, and thereby the polyimide (P) can be obtained. Examples of the imidization method include a chemical imidization method and a thermal imidization method. The chemical imidization method is a method for imidizing polyamic acid under a room temperature condition, for example, using a dehydration condensation agent. Examples of the dehydration condensation agent include acetic anhydride, pyridine, and triethylamine. The thermal imidization method is a method for imidizing polyamic acid by a heat treatment. The heat treatment is carried out at a temperature of 180° C. or higher, for example.

Thereafter, a dispersion (or solution) containing the polyimide (P) is applied onto the porous support member 2 to obtain a coating. The coating is dried to form the separation functional layer 1. Thereby, the separation membrane 10 can be produced.

The method for forming the separation functional layer 1 is not limited to the above method. The separation functional layer 1 may be formed, for example, by imidizing the polyamic acid after applying a dispersion (or solution) containing the polyamic acid onto the porous support member 2.

(Properties of Separation Membrane)

In the separation membrane 10 of the present embodiment, the separation functional layer 1 includes the polyimide (P) having the structural unit X and the structural unit Y. The polyimide (P) having the structural unit X is likely to facilitate water penetration into the separation functional layer 1. That is, the structural unit X tends to improve a separation factor α1 of the separation membrane 10 in an initial state for water with respect to ethanol. In one example, the separation factor α1 of the separation membrane 10 is, for example, 20 or more, preferably 30 or more, more preferably 40 or more, and even more preferably 50 or more. The upper limit of the separation factor α1 is, for example, but not particularly limited to, 1000.

The separation factor α1 can be measured by the following method. First, in a state in which a liquid mixture composed of ethanol and water is in contact with one surface (for example, a principal surface 11 of the separation membrane 10 on the separation functional layer side) of the separation membrane 10, a space adjacent to the other surface (for example, a principal surface 12 of the separation membrane 10 on the porous support member side) of the separation membrane 10 is decompressed. As a result, a permeation fluid having permeated through the separation membrane 10 is obtained. A volume rate of water and a volume rate of ethanol in the permeation fluid are measured. In the above operation, the ethanol concentration in the liquid mixture is 50 vol % (44 wt %) when measured with a temperature of the liquid mixture at 20° C. The liquid mixture in contact with the separation membrane 10 has a temperature of 60° C. The space adjacent to the other surface of the separation membrane 10 is decompressed in such a manner that a pressure in the space is lower than an atmospheric pressure in a measurement environment by 100 kPa. The separation factor α can be calculated by the following formula. It should be noted that, in the following formula, $X_A$ and $X_B$ are respectively the volume rate of water and the volume rate of alcohol in the liquid mixture. $Y_A$ and $Y_B$ are respectively the volume rate of water and the volume rate of alcohol in the permeated fluid having permeated through the separation membrane 10.

$$\text{Separation factor } \alpha 1 = (Y_A/Y_B)/(X_A/X_B)$$

In the above conditions for measuring the separation factor α1, the flux T1 of water permeating through the separation membrane 10 is, for example, 0.05 (kg/m²/hr) or more, preferably 0.10 (kg/m²/hr) or more, more preferably 0.15 (kg/m²/hr) or more, even more preferably 0.20 (kg/m²/hr) or more, particularly preferably 0.30 (kg/m²/hr) or more, and especially preferably 0.40 (kg/m²/hr) or more. The upper limit of the flux T1 of water permeating through the separation membrane 10 is not particularly limited, and it is, for example, 1.0 (kg/m²/hr).

Furthermore, the structural unit Y included in the polyimide (P) is relatively rigid and has a stable structure. Because of this, the structural unit Y makes it less likely for the polyimide (P) to swell with water and alcohol. The polyimide (P) as just described is accordingly suitable for reducing a decrease in the separation performance of the separation membrane 10 through long-term use.

A decrease in the separation performance of the separation membrane 10 through long-term use can be evaluated, for example, by the following durability test. First, the separation membrane 10 is immersed in a liquid mixture composed of ethanol and water for one month. In the durability test, the ethanol concentration in the liquid mixture is 50 vol % (44 wt %) when measured with a temperature of the liquid mixture at 20° C. The liquid mixture in which the separation membrane 10 is immersed has a temperature of 60° C. Next, the separation membrane 10 is taken out of the liquid mixture and dried. After this durability test, a separation factor α2 of the separation membrane 10 is measured in the same manner as for the separation factor α1. A decrease in the separation performance can be evaluated based on a ratio (separation factor retention ratio) of the separation factor α2 to the separation factor α1.

In one example, the separation factor retention ratio (α2/α1) of the separation membrane 10 is, for example, 50% or more, preferably 70% or more, and more preferably 90% or more. The separation factor α2 after the durability test is not particularly limited, and is, for example, 20 or more, preferably 30 or more, more preferably 40 or more, and even more preferably 50 or more. The upper limit of the separation factor α2 is, for example, but not particularly limited to, 1000.

In the above conditions for measuring the separation factor α2, a flux T2 of water permeating through the separation membrane 10 having undergone the durability test is, for example, 0.05 (kg/m²/hr) or more, preferably 0.10 (kg/m²/hr) or more, more preferably 0.15 (kg/m²/hr) or more, even more preferably 0.20 (kg/m²/hr) or more, particularly preferably 0.30 (kg/m²/hr) or more, and especially preferably 0.40 (kg/m²/hr) or more.

The upper limit of the flux of water permeating through the separation membrane 10 is, for example, but not particularly limited to, 1.0 (kg/m²/hr). A ratio of the flux T2 to the flux T1 is, for example, but not particularly limited to, 70% to 130%.

The separation factor retention ratio (α2/α1) of a conventional separation membrane tends to greatly decrease when a separation functional layer thereof includes a filler. On the other hand, the separation factor retention ratio (α2/α1) of the separation functional layer 1, which includes the polyimide (P) having the structural unit X and the structural unit Y, tends to be high even when the separation functional layer 1 includes the filler.

Embodiment of Membrane Separation Device

Figure 2:
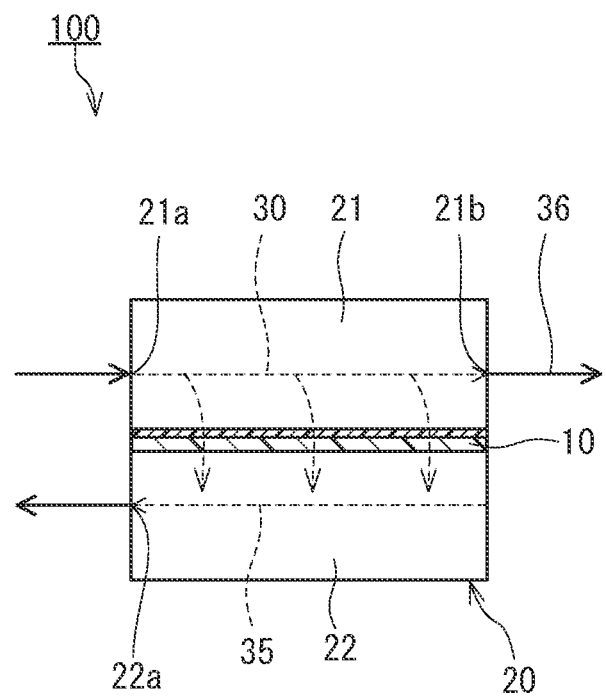
FIG. 2 is a schematic cross-sectional view of a membrane separation device including the separation membrane of the present invention.

As shown in FIG. 2, a membrane separation device 100 of the present embodiment includes the separation membrane 10 and a tank 20. The tank 20 includes a first chamber 21 and a second chamber 22. The separation membrane 10 is disposed in the tank 20. In the tank 20, the separation membrane 10 separates the first chamber 21 and the second chamber 22 from each other. The separation membrane 10 extends from one of a pair of wall surfaces of the tank 20 to the other.

The first chamber 21 has an inlet 21a and an outlet 21b. The second chamber 22 has an outlet 22a. The inlet 21a, the outlet 21b, and the outlet 22a are each, for example, an opening provided in a wall surface of the tank 20.

Membrane separation using the membrane separation device 100 is performed by the following method, for example. First, a liquid mixture 30 containing an alcohol and water is supplied into the first chamber 21 via the inlet 21a. This allows the liquid mixture 30 to have contact with one surface of the separation membrane 10. The alcohol contained in the liquid mixture 30 is, for example, a lower alcohol that exhibits azeotropy with water. The alcohol is preferably ethanol. The alcohol may be isopropyl alcohol (IPA). The alcohol concentration in the liquid mixture 30 is, for example, 10 wt % or more and preferably 20 wt % or more. The separation membrane 10 is particularly suitable for separating water from the liquid mixture 30 in which the alcohol concentration is moderate (20 wt % to 80 wt %, particularly 30 wt % to 70 wt %). It should be noted that the alcohol concentration in the liquid mixture 30 may be 80 wt % or more. The liquid mixture 30 may be composed substantially of the alcohol and water. A temperature of the liquid mixture 30 may be higher than the boiling point of the alcohol used.

Preferably, the temperature of the liquid mixture 30 is lower than the boiling point of the alcohol. The temperature of the liquid mixture 30 is, for example, 25° C. or higher, preferably 40° C. or higher, and more preferably 60° C. or higher. The temperature of the liquid mixture 30 may be 75° C. or lower.

Next, in a state in which the liquid mixture 30 is in contact with one surface of the separation membrane 10, a space adjacent to the other surface of the separation membrane 10 is decompressed. Specifically, an inside of the second chamber 22 is decompressed via the outlet 22a. The membrane separation device 100 may further include a pump (not shown) for decompressing the inside of the second chamber 22. The second chamber 22 is decompressed in such a manner that the space in the second chamber 22 has a pressure lower than an atmospheric pressure in a measurement environment by, for example, 10 kPa or more, preferably 50 kPa or more, and more preferably 100 kPa or more.

Decompressing the inside of the second chamber 22 allows to obtain, on the other surface side of the separation membrane 10, a permeation fluid 35 in which the water content is higher than that in the liquid mixture 30. That is, the permeated fluid 35 is supplied to the second chamber 22. The permeation fluid 35 contains, for example, water as a main component. The permeation fluid 35 may contain a small amount of the alcohol in addition to the water. The permeation fluid 35 may be a gas or a liquid. The permeated fluid 35 is discharged outside the tank 20 via the outlet 22a.

The alcohol concentration in the liquid mixture 30 increases gradually from the inlet 21a toward the outlet 21b of the first chamber 21. The liquid mixture 30 (a concentrated fluid 36) processed in the first chamber 21 is discharged to the outside of the tank 20 via the outlet 21b.

The membrane separation device 100 of the present embodiment is used preferably for a pervaporation method. The membrane separation device 100 may be used for other membrane separation methods such as a vapor permeation method. That is, a mixture gas containing a gaseous alcohol and gaseous water may be used instead of the liquid mixture 30 in the above membrane separation method. The membrane separation device 100 of the present embodiment is suitable for a flow (continuous) membrane separation method. The membrane separation device 100 of the present embodiment may be used for a batch membrane separation method.

<Modification of Membrane Separation Device>

Figure 3:
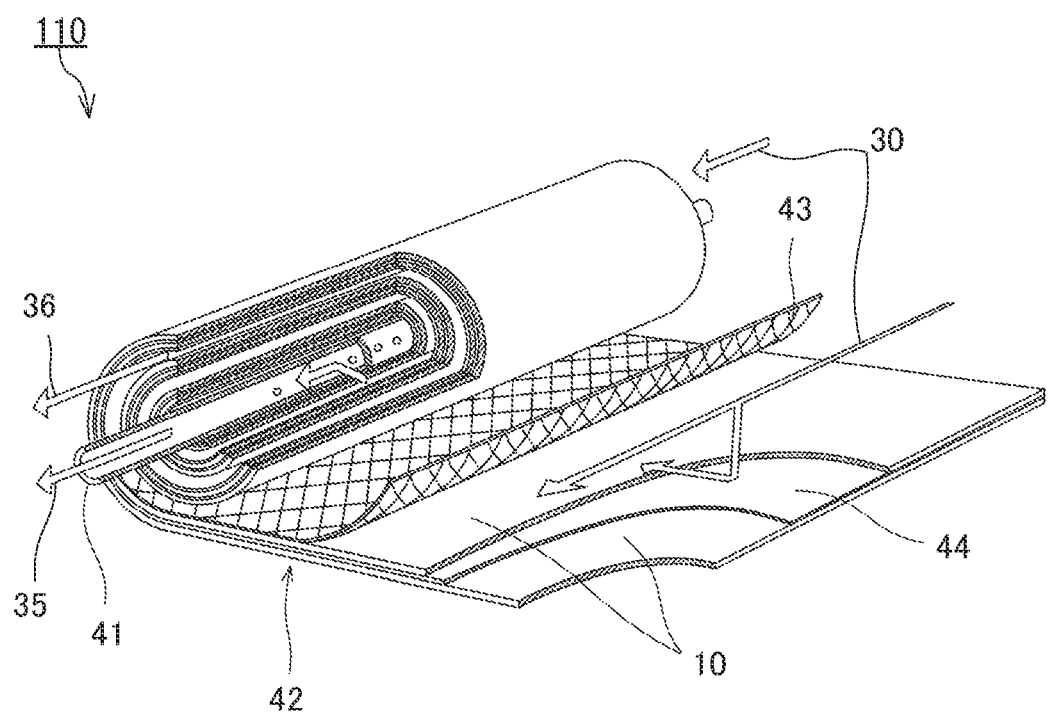
FIG. 3 is a perspective view schematically showing a modification of the membrane separation device including the separation membrane of the present invention.

As shown in FIG. 3, a membrane separation device 110 of the present embodiment includes a central tube 41 and a laminate 42. The laminate 42 includes the separation membrane 10. The membrane separation device 110 is a spiral membrane element.

The central tube 41 has a cylindrical shape. The central tube 41 has, in its surface, a plurality of holes for allowing the permeated fluid 35 to flow into the central tube 41. Examples of the material of the central tube 41 include: resins such as an acrylonitrile-butadiene-styrene copolymer resin (ABS resin), a polyphenylene ether resin (PPE resin), and a polysulfone resin (PSF resin); and metals such as stainless steel and titanium. The central tube 41 has an inner diameter, for example, in the range of 20 to 100 mm.

The laminate 42 further includes a supply-side flow passage material 43 and a permeation-side flow passage material 44 in addition to the separation membrane 10. The laminate 42 is wound around the central tube 41. The membrane separation device 110 may further include an exterior material (not shown).

For example, a resin net composed of polyphenylene sulfide (PPS) or an ethylene-chlorotrifluoroethylene copolymer (ECTFE) can be used as the supply-side flow passage material 43 and the permeation-side flow passage material 44.

Membrane separation using the membrane separation device 110 is performed by the following method, for example. First, the liquid mixture 30 is supplied into one end of the wound laminate 42. An inner space of the central tube 41 is decompressed. Thereby, the permeation fluid 35 having permeated through the separation membrane 10 of the laminate 42 moves into the central tube 41. The permeated fluid 35 is discharged outside via the center tube 41. The liquid mixture 30 (the concentrated fluid 36) processed by the membrane separation device 110 is discharged outside from the other end of the wound laminate 42. Thereby, water can be separated from the liquid mixture 30.

EXAMPLES

Hereinafter, the present invention will be described in more detail by way of Examples and Comparative Examples, but the present invention is not limited to these.

Example 1

First, bis(1,3-dioxo-1,3-dihydroisobenzofuran-5-carboxylic acid)ethylene (compound c1) and 5,5'-[1-methyl-1,1-ethanediylbis(1,4-phenylene)bisoxy]bis(isobenzofuran-1,3-dione) (compound c2) were prepared at a molar ratio of 70:30 as tetracarboxylic dianhydrides. As diamine compounds were prepared 4,4'-diaminodiphenylether and 3,5-diaminobenzoic acid at a molar ratio of 90:10. Next, the diamine compound was dissolved in N-methyl-2-pyrrolidone to obtain a solution.

The tetracarboxylic dianhydrides were added to the obtained solution under a room temperature condition to obtain polyamic acid. Next, the polyamic acid was chemically imidized using triethylamine and acetic anhydride to obtain a polyimide. The chemical imidization was carried out at 60° C. in N-methyl-2-pyrrolidone.

Next, the polyimide was dissolved in 1,3-dioxolane. The obtained solution was applied onto a porous support member to obtain a coating. As the porous support member, a UF membrane (ultrafiltration membrane) RS-50 (a laminate of a porous PVDF layer and a nonwoven PET fabric) available from Nitto Denko Corporation was used.

The coating was formed on the porous PVDF layer of the RS-50. Next, the coating was dried to form a separation functional layer. The separation functional layer had a thickness of about 2 µm. A separation membrane of Example 1 was obtained in this manner.

Next, the separation factor α1 of the separation membrane of Example 1 in an initial state and the flux of water having permeated through the separation membrane were measured by the following method. First, the separation membrane of Example 1 was placed in a metal cell, and the metal cell was sealed with an O-ring so that no leakage would occur. Next, 250 ml of a liquid mixture was injected into the metal cell so that the liquid mixture would come into contact with the principal surface of the separation membrane on the separation functional layer side. The liquid mixture was composed substantially of ethanol and water. The ethanol concentration in the liquid mixture was 50 vol % when measured with a temperature of the liquid mixture at 20° C. Next, the metal cell was heated to 60° C. in a water bath. The temperature of the liquid mixture in the metal cell was confirmed to be 60° C., and then a space, in the metal cell, that is adjacent to the principal surface of the separation membrane on the porous support member side was decompressed. This space was decompressed in such a manner that a pressure in the space was lower than an atmospheric pressure in a measurement environment by 100 kPa. Thereby, a gaseous permeation fluid was obtained. The gaseous permeation fluid was cooled using −196° C. liquid nitrogen to liquefy the permeation fluid. The composition of the liquid permeation fluid was analyzed by gas chromatography. The separation factor α1 of the separation membrane and the flux of water having permeated through the separation membrane were calculated based on the composition of the permeation fluid, the weight of the permeation fluid, etc.

Next, the separation membrane of Example 1 was subjected to the above-described durability test. After the durability test, the separation factor 2 of the separation membrane and the flux of water having permeated through the separation membrane were measured in the same manner as for the separation factor α1. Table 3 shows the results.

Example 2 and Comparative Examples 1 to 5

Separation membranes of Example 2 and Comparative Examples 1 to 5 were 5 produced in the same manner as in Example 1, except that the types of the tetracarboxylic dianhydrides used and the rates thereof were changed as shown in Table 3. For 4,4'-(hexafluoroisopropylidene)diphthalic anhydride (compound c3) used in Comparative Examples 3 to 5, the SP value of a linking group ($-C(CF_3)_2-$) bonding two phthalimide structures was 5.00 $(cal/cm^3)^{1/2}$.

The properties of the separation membranes of Example 2 and Comparative Examples 1 to 5 were evaluated in the same manner as for Example 1. Table 3 shows the results.

As can be seen from the results for Examples 1 and 2, a separation membrane including the polyimide having the structural units X and Y has a separation factor α1 large enough for practical use in the initial state, and is suitable for separating water from a liquid mixture containing an alcohol and water. Moreover, such a separation membrane has a high separation factor retention ratio (α2/α1), from which it is inferred that a decrease in the separation performance thereof is reduced regardless of long-term use.

On the other hand, as can be seen from the results for Comparative Examples 1 to 5, when the polyimide does not include one or both of the structural units X and Y, the separation factor α1 in the initial state or the separation factor retention ratio is low.

TABLE 3

| | Tetracarboxylic dianhydride | | | | | | | PV evaluation | | | | |
| | Compound forming structural unit X | | | Compound forming structural unit Y | | | Compound forming another structural unit | | | Initial state | | After durability test | | |
| | Type | SP value of $A^1$ [(cal/ $cm^3)^{1/2}$] | Rate (mol %) | Type | SP value of $A^3$ [(cal/ $cm^3)^{1/2}$] | Rate (mol %) | Type | SP value of linking group [$(cal/cm^3)^{1/2}$] | Rate (mol %) | Separation factor α1 [—] | Flux of water (kg/m²/hr) | Separation factor α2 [—] | Flux of water (kg/m²/hr) | α2/α1 (%) |
|---|---|---|---|---|---|---|---|---|---|---|---|---|---|---|
| Example 1 | c1 | 12.68 | 70 | c2 | 11.02 | 30 | — | — | — | 56 | 0.17 | 58 | 0.16 | 103.6 |
| Example 2 | c1 | 12.68 | 50 | c2 | 11.02 | 50 | — | — | — | 44 | 0.21 | 35 | 0.26 | 79.5 |
| Comparative Example 1 | c1 | 12.68 | 100 | — | — | — | — | — | — | 108 | 0.12 | 5 | 0.18 | 4.6 |
| Comparative Example 2 | — | — | — | c2 | 11.02 | 100 | — | — | — | 19 | 0.45 | 15 | 0.45 | 78.9 |
| Comparative Example 3 | — | — | — | — | — | — | c3 | 5.00 | 100 | 2 | 1.16 | 4 | 0.51 | 200.0 |
| Comparative Example 4 | c1 | 12.68 | 70 | — | — | — | c3 | 5.00 | 30 | 18 | 0.34 | 6 | 0.39 | 33.3 |
| Comparative Example 5 | c1 | 12.68 | 50 | — | — | — | c3 | 5.00 | 50 | 9 | 0.5 | 10 | 0.53 | 111.1 | c1:
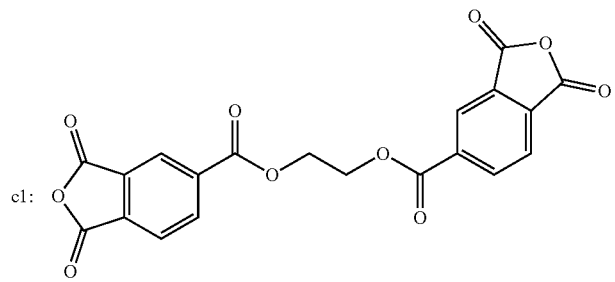 [SMILES: O=C(OCCOC(=O)c1ccc2c(c1)C(=O)OC2=O)c1ccc2c(c1)C(=O)OC2=O]

c2:
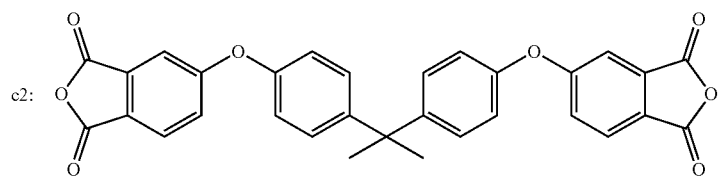 [SMILES: CC(C)(c1ccc(Oc2ccc3c(c2)C(=O)OC3=O)cc1)c1ccc(Oc2ccc3c(c2)C(=O)OC3=O)cc1]

c3:
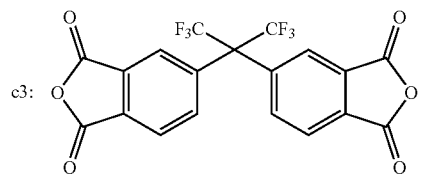 [SMILES: O=C1OC(=O)c2cc(C(c3ccc4c(c3)C(=O)OC4=O)(C(F)(F)F)C(F)(F)F)ccc21]

Example 3

A separation membrane of Example 3 was produced in the same manner as in Example 1, except that the solution containing the polyimide was added to a dispersion containing a filler before the separation functional layer was formed. A molecular sieve 4A (Zeoal 4A (particle size: 300 nm) manufactured by Nakamura Choukou Co., Ltd.) was used as the filler. The content of the filler in the separation functional layer was 20 wt %.

Comparative Example 6

A separation membrane of Comparative Example 6 was produced in the same manner as in Comparative Example 1, except that the solution containing the polyimide was added to the dispersion containing the filler before the separation functional layer was formed. A molecular sieve 4A (Zeoal 4A (particle size: 300 nm) manufactured by Nakamura Choukou Co., Ltd.) was used as the filler. The content of the filler in the separation functional layer was 20 wt %.

The properties of the separation membranes of Example 3 and Comparative Example 6 were evaluated in the same manner as for Example 1. Table 4 shows the results.

TABLE 4

| | Tetracarboxylic dianhydride | | | | | Filler (content: 20 wt %) | PV evaluation | | | | |
|---|---|---|---|---|---|---|---|---|---|---|---|
| | Compound forming structural unit X | | | Compound forming structural unit Y | | | Initial state | | After durability test | | |
| | Type | SP value of $A^1$ [(cal/cm$^3$)$^{1/2}$] | Rate (mol %) | Type | SP value of $A^3$ [(cal/cm$^3$)$^{1/2}$] | Rate (mol %) | | Separation factor $\alpha 1$ [—] | Flux of water (kg/m$^2$/hr) | Separation factor $\alpha 2$ [—] | Flux of water (kg/m$^2$/hr) | $\alpha 2/\alpha 1$ (%) |
| Example 3 | c1 | 12.68 | 70 | c2 | 11.02 | 30 | 4A-300 | 61 | 0.45 | 43 | 0.36 | 70.5 |
| Comparative Example 6 | c1 | 12.68 | 100 | — | — | — | 4A-300 | 104 | 0.33 | 8 | 0.61 | 7.7 |

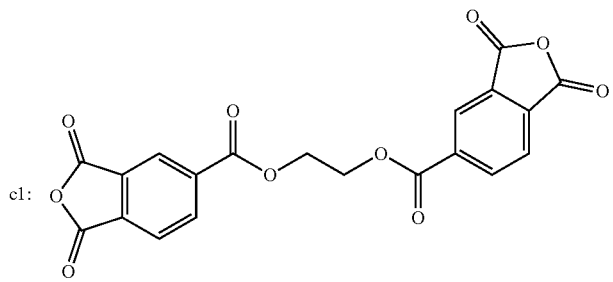 [SMILES: O=C(OCCOC(=O)c1ccc2c(c1)C(=O)OC2=O)c1ccc2c(c1)C(=O)OC2=O]

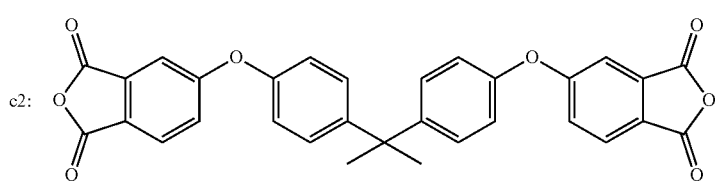 [SMILES: CC(C)(c1ccc(Oc2ccc3c(c2)C(=O)OC3=O)cc1)c1ccc(Oc2ccc3c(c2)C(=O)OC3=O)cc1]

As can be seen from the result for Example 3, the polyimide having the structural units X and Y had a high separation factor retention ratio ($\alpha 2/\alpha 1$) regardless of the filler included in the separation functional layer.

INDUSTRIAL APPLICABILITY

The separation membrane of the present embodiment is suitable for separating water from a liquid mixture containing an alcohol and water. In particular, the separation membrane of the present embodiment is useful for refining bioethanol.

The invention claimed is:
1. A separation membrane for separating water from a liquid mixture containing an alcohol and water, the separation membrane comprising:
a polyimide, wherein
the polyimide has a structural unit X represented by the following formula (1) and a structural unit Y represented by the following formula (2):

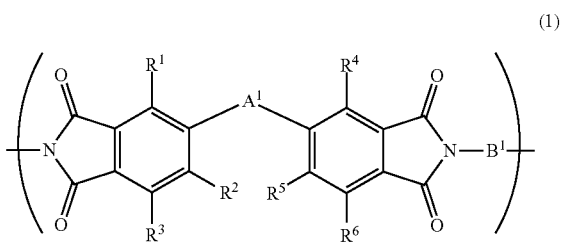

(1)

-continued

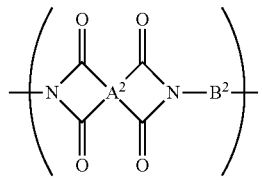

(2)

in the formula (1), $A^1$ is a linking group including no arylene group in a main chain and having a solubility parameter, in accordance with a Fedors method, of more than 5.0 $(cal/cm^3)^{1/2}$, $B^1$ is a divalent organic group, and $R^1$ to $R^6$ are each independently a hydrogen atom, a halogen atom, a hydroxyl group, a sulfonic acid group, an alkoxy group having 1 to 30 carbon atoms, or a hydrocarbon group having 1 to 30 carbon atoms, and in the formula (2), $A^2$ is a tetravalent organic group including an arylene group and $B^2$ is a divalent organic group.

2. The separation membrane according to claim 1, wherein $B^1$ in the formula (1) and/or $B^2$ in the formula (2) is represented by the following formula (3):

$$-Ar^1-B^3-Ar^2- \qquad (3)$$

where $B^3$ is a linking group, $Ar^1$ and $Ar^2$ are each a divalent aromatic group, and when $Ar^1$ and $Ar^2$ are each an optionally substituted phenylene group, $Ar^1$ and $Ar^2$ are each represented by the following formula (4):

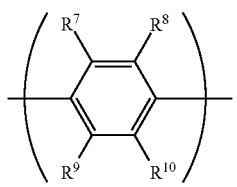
(4)

where $R^7$ to $R^{10}$ are each independently a hydrogen atom, a halogen atom, a hydroxyl group, a sulfonic acid group, an alkoxy group having 1 to 30 carbon atoms, or a hydrocarbon group having 1 to 30 carbon atoms.

3. The separation membrane according to claim 2, wherein in the formula (3), the linking group represented by $B^3$ has a solubility parameter, in accordance with the Fedors method, of more than 8.56 $(cal/cm^3)^{1/2}$.

4. The separation membrane according to claim 2, wherein in the formula (3), $B^3$ includes at least one selected from the group consisting of an ether group and a carbonyl group.

5. The separation membrane according to claim 1, wherein in the formula (1), the number of atoms constituting a bonding chain, among bonding chains bonding two phthalimide structures linked to each other by $A^1$, that is composed of a least number of atoms is 2 or more.

6. The separation membrane according to claim 1, wherein $A^1$ in the formula (1) includes an ester group.

7. The separation membrane according to claim 1, wherein the structural unit Y is represented by the following formula (5):

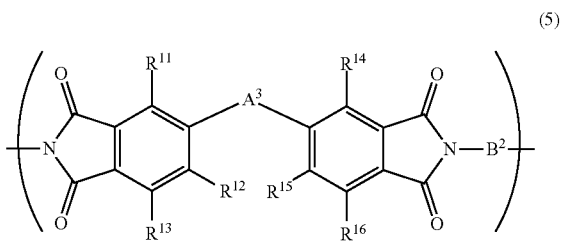
(5)

where $A^3$ is a linking group including an arylene group in a main chain, $B^2$ is a divalent organic group, and $R^{11}$ to $R^{16}$ are each independently a hydrogen atom, a halogen atom, a hydroxyl group, a sulfonic acid group, an alkoxy group having 1 to 30 carbon atoms, or a hydrocarbon group having 1 to 30 carbon atoms.

8. The separation membrane according to claim 7, wherein, in the formula (5), the linking group represented by $A^3$ has a solubility parameter, in accordance with the Fedors method, of more than 5.0 $(cal/cm^3)^{1/2}$.

9. The separation membrane according to claim 7, wherein, in the formula (5), the number of atoms constituting a bonding chain, among bonding chains bonding two phthalimide structures linked to each other by $A^3$, that is composed of a least number of atoms is 6 or more.

10. The separation membrane according to claim 7, wherein $A^3$ in the formula (5) includes an ether group.

11. The separation membrane according to claim 1, wherein a content of the structural unit X in the polyimide is 40 mol % to 80 mol %.

* * * * *